(12) United States Patent
Liu et al.

(10) Patent No.: US 11,814,485 B1
(45) Date of Patent: Nov. 14, 2023

(54) LINEAR BLOCK COPOLYMER TOUGHENER WITH ACRYLATE FUNCTIONAL GROUPS

(71) Applicant: Ele' Corporation, McCook, IL (US)

(72) Inventors: Jia Liu, Lake Villa, IL (US); Alexander Papadakis, Oak Park, IL (US); Michael Terralavoro, Chicago, IL (US)

(73) Assignee: ELE' CORPORATION, McCook, IL (US)

( * ) Notice: Subject to any disclaimer, the term of this patent is extended or adjusted under 35 U.S.C. 154(b) by 0 days.

(21) Appl. No.: 18/197,010

(22) Filed: May 12, 2023

Related U.S. Application Data

(63) Continuation of application No. PCT/US2022/025971, filed on Apr. 22, 2022.

(51) Int. Cl.
| | |
|---|---|
| *C08G 77/46* | (2006.01) |
| *C08L 63/00* | (2006.01) |
| *C08L 33/06* | (2006.01) |

(52) U.S. Cl.
CPC .............. *C08G 77/46* (2013.01); *C08L 33/06* (2013.01); *C08L 63/00* (2013.01)

(58) Field of Classification Search
CPC .......... C08G 77/46; C08L 33/06; C08L 63/00

USPC ........................................................ 525/92 A
See application file for complete search history.

(56) References Cited

U.S. PATENT DOCUMENTS

| | | | |
|---|---|---|---|
| 5,691,444 A | 11/1997 | Shalaby et al. | |
| 11,518,854 B2 | 12/2022 | Eubank et al. | |
| 2008/0051511 A1 | 2/2008 | Guerret et al. | |
| 2013/0184376 A1 | 7/2013 | Baidak et al. | |
| 2020/0291188 A1 | 9/2020 | Eubank et al. | |

FOREIGN PATENT DOCUMENTS

| | | | | |
|---|---|---|---|---|
| CN | 111171253 A | | 5/2020 | |
| WO | WO-2021014219 A2 | * | 1/2021 | ............. A61L 15/58 |

OTHER PUBLICATIONS

PCT International Search Report to corresponding PCT Application No. PCT/US22/25971, completed on Jun. 17, 2022 and dated Jul. 25, 2022, 2 pages.
PCT Written Opinion of the International Searching Authority to corresponding PCT Application No. PCT/US22/25971, completed on Jun. 17, 2022 and dated Jul. 25, 2022, 4 pages.

* cited by examiner

*Primary Examiner* — David T Karst
(74) *Attorney, Agent, or Firm* — Clark Hill PLC

(57) ABSTRACT

Embodiments of the present invention provide an acrylate-functionalized polysiloxane-bisphenol A polyether block copolymer for use as a toughener with thermosetting resins.

21 Claims, 14 Drawing Sheets

|      | $R_1$ | $R_2$ | $R_3$ | x | y | z | MW |
|------|-------|-------|-------|---|---|---|------|
| LBCP1 | -CH$_3$ | -CH$_2$CH$_2$CH$_2$- | -CH$_2$CH$_2$CH$_2$- | 1 | 5 | 2 | 2155 |
| LBCP2 | -CH$_3$ | -CH$_2$CH$_2$CH$_2$- | -CH$_2$CH$_2$CH$_2$- | 2 | 5 | 4 | 4297 |
| LBCP3 | -CH$_3$ | -CH$_2$CH$_2$CH$_2$- | -CH$_2$CH$_2$CH$_2$- | 4 | 5 | 8 | 9469 |

Figure 2

| | \multicolumn{10}{c}{Sample} | | | | | | | | | |
|---|---|---|---|---|---|---|---|---|---|---|
| | 1 | 2 | 3 | 4 | 5 | 6 | 7 | 8 | 9 | 10 |
| Hetron 922 (g) | 100 | 95 | 95 | 95 | 90 | 90 | 90 | 85 | 85 | 85 |
| LBCP1 (g) | - | 5 | - | - | 10 | - | - | 15 | - | - |
| LBCP2 (g) | - | - | 5 | - | - | 10 | - | - | 15 | - |
| LBCP3 (g) | - | - | - | 5 | - | - | 10 | - | - | 15 |
| MEKP (g) | 1.5 | 1.5 | 1.5 | 1.5 | 1.5 | 1.5 | 1.5 | 1.5 | 1.5 | 1.5 |
| K1c (Mpa.M$^{1/2}$) | 1.18 | 1.34 | 1.24 | 1.54 | 1.38 | 1.52 | 1.58 | 1.46 | 1.33 | 1.37 |
| G1c (J/M$^2$) | 523 | 650 | 545 | 809 | 707 | 892 | 914 | 810 | 731 | 747 |
| Tensile Strength (Mpa) | 79.37 | 84.17 | 83.80 | 81.77 | 69.16 | 73.27 | 70.74 | 64.52 | 61.62 | 62.29 |
| Elongation (%) | 4.34 | 4.32 | 4.09 | 4.22 | 4.63 | 4.43 | 4.58 | 3.97 | 4.30 | 4.05 |
| Young's Modulus (Mpa) | 2478 | 2598 | 2607 | 2525 | 2313 | 2351 | 2238 | 2238 | 2184 | 2217 |
| Impact Resistance | 1 | 1 | 1 | 2 | 2 | 2 | 2 | 3 | 3.5 | 5 |
| Appearance pre-cure | C | C | C | C | C | C | C | C | C | C |
| Appearance post-cure | C | H | O | O | O | O | O | O | O | O |

C=Clear, O=Opaque, H=Hazy

Figure 3

|  | Sample | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| DGEBA (g) | 100 | 90 | 90 | 95 | 95 | 95 | 90 | 90 | 90 | 85 | 85 | 85 |
| LBCP1 (g) |  |  |  | 5 |  |  |  |  |  |  |  |  |
| LBCP2 (g) |  |  |  |  | 5 |  | 10 | 10 |  |  |  |  |
| LBCP3 (g) |  |  |  |  |  | 5 |  |  | 10 |  | 15 | 15 |
| Hypro 1300x8 |  | 10 |  |  |  |  |  |  |  | 15 |  |  |
| XT100 |  |  | 10 |  |  |  |  |  |  |  |  |  |
| TETA | 13 | 13 | 13 | 13 | 13 | 13 | 13 | 13 | 13 | 13 | 13 | 13 |
| K1c (Mpa.M$^{½}$) | 0.66 | 1.00 | 0.88 | 1.00 | 1.07 | 1.10 | 0.91 | 0.96 | 0.94 | 0.85 | 0.87 | 0.84 |
| G1c (J/M$^2$) | 205 | 431 | 359 | 390 | 385 | 464 | 343 | 354 | 343 | 304 | 317 | 315 |
| Tensile Strength (Mpa) | 58.36 | 66.08 | 47.57 | 77.13 | 70.62 | 74.80 | 73.69 | 72.98 | 72.76 | 62.70 | 65.23 | 62.29 |
| Elongation (%) | 3.35 | 4.06 | 2.84 | 4.65 | 3.62 | 4.92 | 4.43 | 4.36 | 4.90 | 4.47 | 4.65 | 4.62 |
| Young's Modulus (Mpa) | 2104 | 1978 | 1942 | 1958 | 2245 | 1808 | 2038 | 2015 | 1827 | 1675 | 1718 | 1621 |
| Impact Resistance | 1 | 3 | 3 | 2.5 | 3 | 4 | 2.5 | 3 | 3 | 2 | 2 | 2 |
| Appearance pre-cure | C | C | C | C | C | C | C | C | C | C | C | C |
| Appearance post-cure | C | O | O | T | T | O | S | S | O | O | O | O |

C=Clear, O=Opaque, T=Translucent, S=Semi-Opaque

Figure 5

LINEAR BLOCK COPOLYMER TOUGHENER WITH ACRYLATE FUNCTIONAL GROUPS

RELATED APPLICATIONS

This application claims the benefit of international Application Number PCT/US2022/025971, filed on Apr. 22, 2022.

TECHNICAL FIELD

The present invention relates to a novel siloxane bisphenol block copolymer terminated by acrylate functional groups which acts as a toughener when used with thermosetting resins.

BACKGROUND ART

Thermosetting resins include epoxies, unsaturated polyesters, vinyl esters, phenolics, polyurethanes, silicones, polyamides, and polyamide-imide, and are used for composites, adhesives, and protective coatings in a variety of industries. During the curing process, which involves application of heat, pressure, ultraviolet light (UV), or electron beams (EB), the individual resin molecules crosslink to form a three-dimensional network which exhibits high strength, hardness, chemical resistance, and thermal stability. However, some cured resins still exhibit inherent brittleness and as such remain vulnerable to fracture and impact.

To address the problem of brittleness in certain resins, siloxane-based tougheners can be added to the resin prior to curing. For example, U.S. Pat. Pub. No. 20200291188 discloses an epoxy-functionalized polyorganosiloxane toughener which, when combined with an epoxy-based thermosetting resin, makes the cured composite less vulnerable to fracture and impact. However, these epoxy-functionalized polyorganosiloxane tougheners have limited reactivity with non-epoxy-based thermosetting resins, such as vinyl esters, unsaturated polyesters, or acrylate functionalized resins.

What is needed, therefore, is a toughener that will chemically react with a non-epoxy-based thermosetting resin during the curing phase, resulting in a permanent bond between the toughener and the resin matrix.

SUMMARY OF INVENTION

Embodiments of the inventive toughener comprise a polysiloxane-alkyl bisphenol A polyether block copolymer terminated in acrylate functional groups. Embodiments of the inventive toughener may be combined with unsaturated thermosetting resins such that during crosslinking or curing, the toughener and resin chemically react to form a permanent bond between the toughener and resin matrix, giving the resulting product higher fracture and impact resistance. Further, the inventive toughener exhibits better compatibility with unsaturated thermosetting resins, which provides better storage stability of the composite prior to curing or crosslinking. Further, the inventive toughener has lower viscosity than other existing tougheners, which improves its processability for mixing with and wetting to pigments, fillers, fibers, and substrates. Further, the inventive toughener, in combination with thermosetting resins, is suitable for EB and UV curing. Further, embodiments of the present invention lay also be used as tougheners for other types of thermosetting resins, including but not limited to saturated epoxy resins.

Without limiting embodiments of the inventive toughener to any particular mechanism, during curing or crosslinking, the inventive toughener may phase out and form separated microphases throughout the resins, with chemical links formed between the toughener-rich microphases and the resin matrix.

BRIEF DESCRIPTION OF DRAWINGS

FIG. 2 identifies the $R_1$, $R_2$, $R_3$ x, y, and z values from FIG. 1 for three specific embodiments of the present invention.

FIG. 3 shows the composition and performance test results of embodiments of the present invention when combined with a vinyl ester thermosetting resin.

FIG. 5 shows the composition and performance test results of embodiments of the present invention when combined with an epoxy thermosetting resin.

DESCRIPTION OF EMBODIMENTS

In the following embodiments of the present invention, polymer segments are expressed in terms of the number of repeating monomer units. These numbers should be interpreted as referring to the statistical average number of monomer units in each molecule and not an exact numerical requirement.

Figure 1:
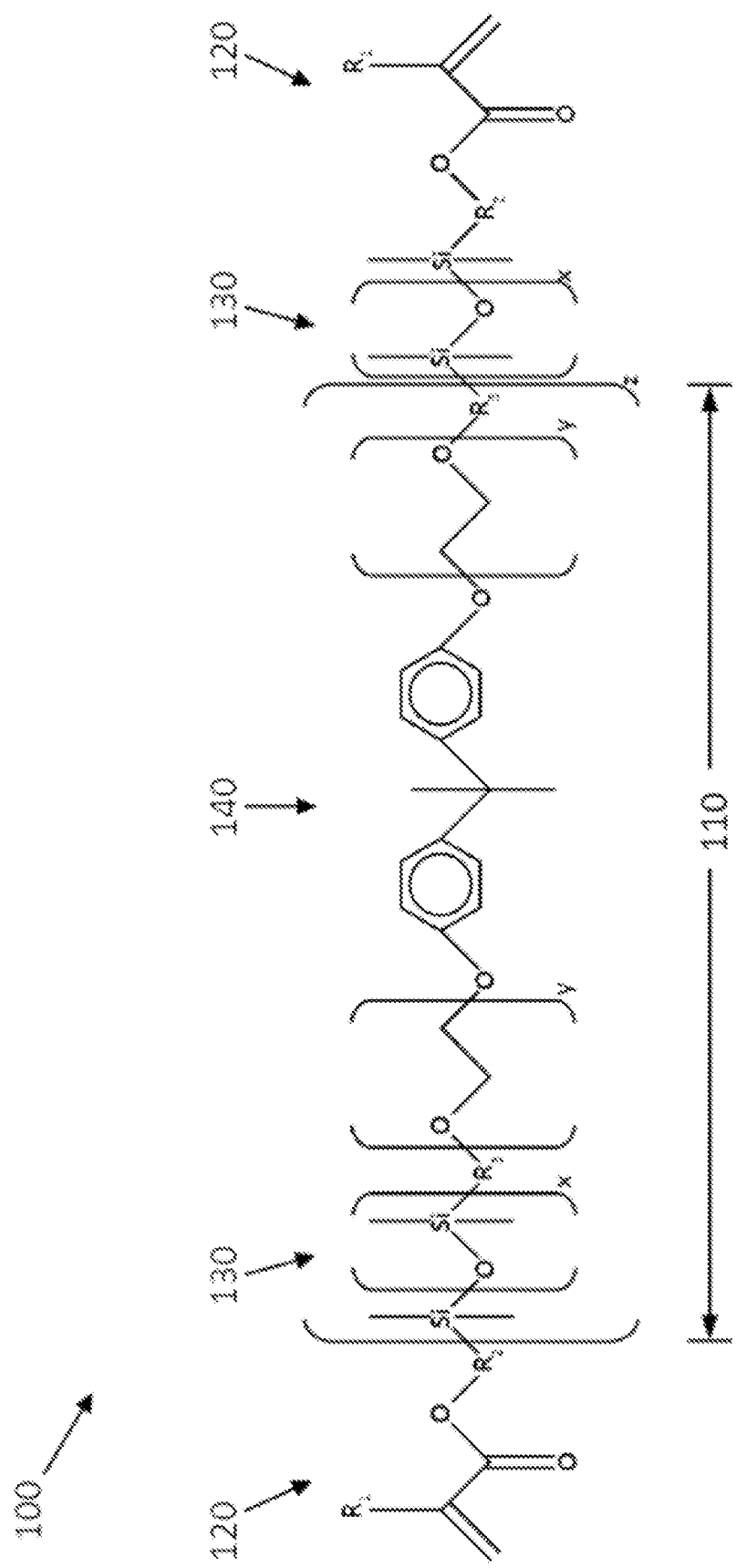
FIG. 1 shows the general structure of an embodiment of the present invention.
Figure 4A:
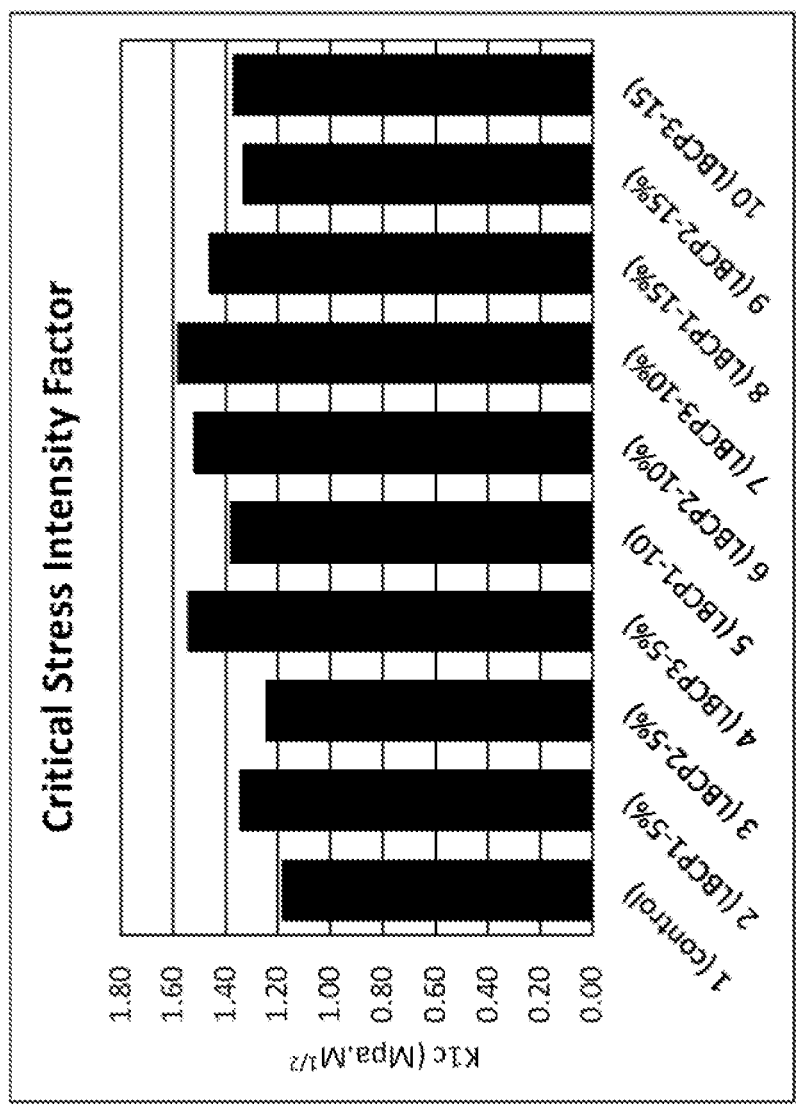
FIGS. 4a-4e show the performance test results of FIG. 3 in bar chart format.
Figure 4B:
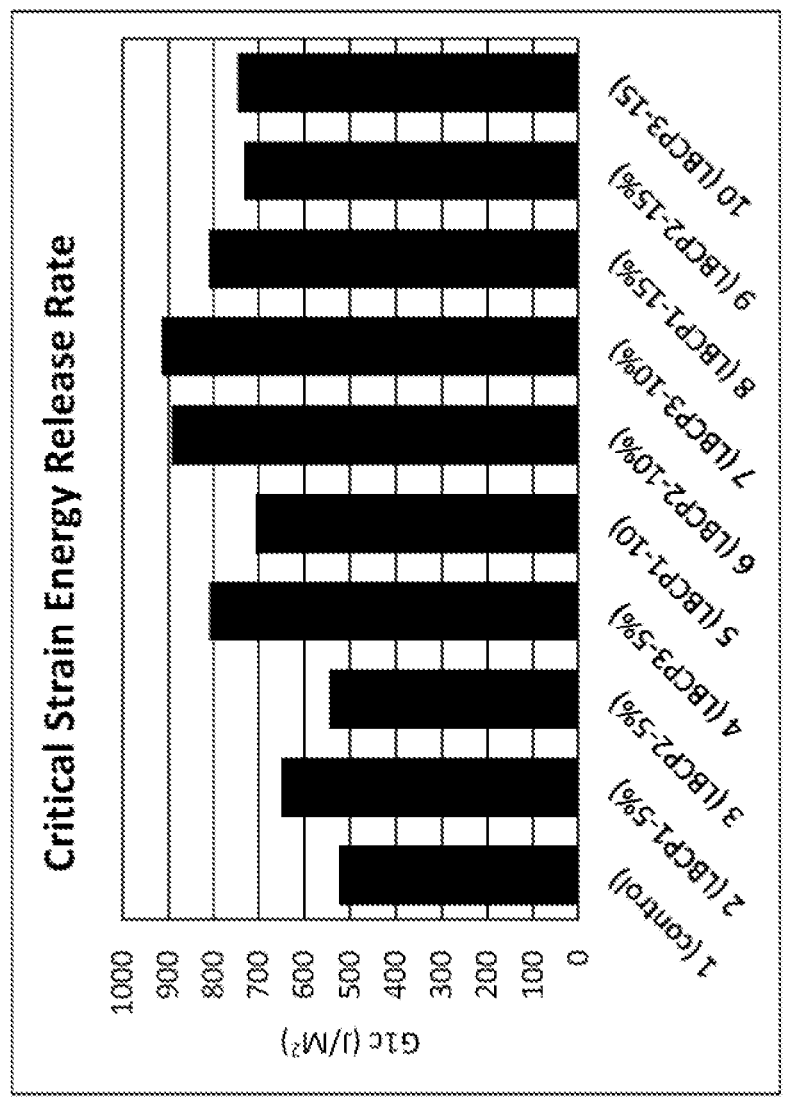
Figure 4C:
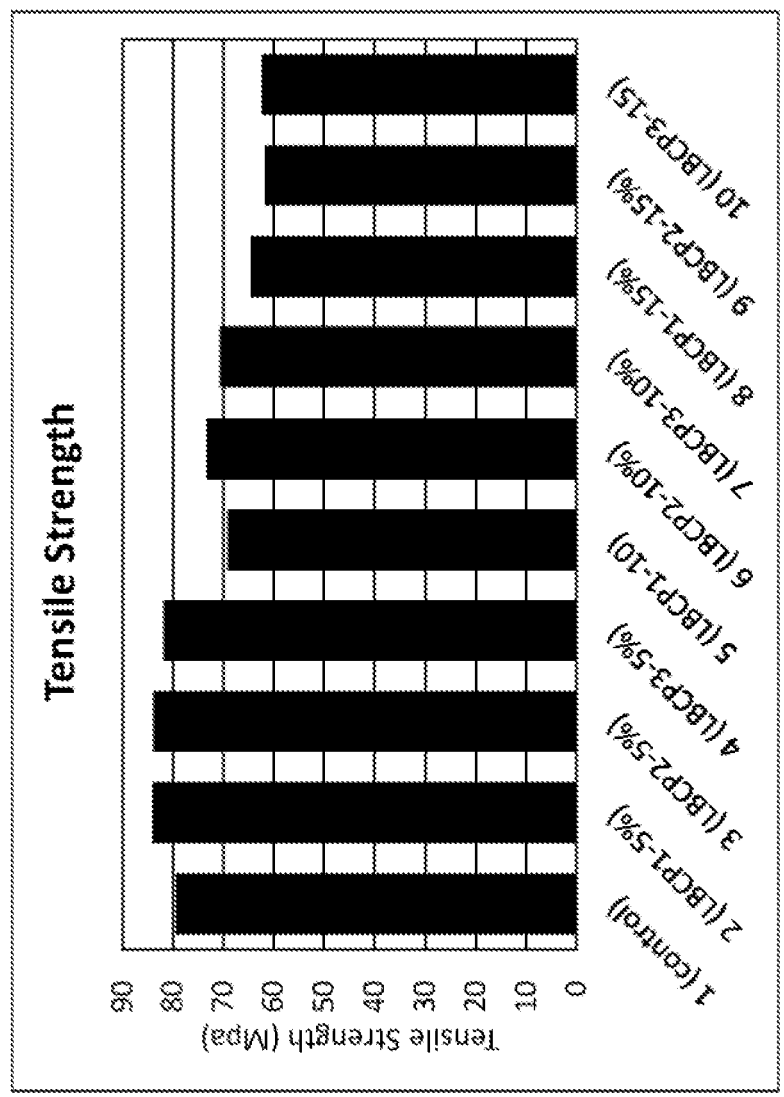
Figure 4D:
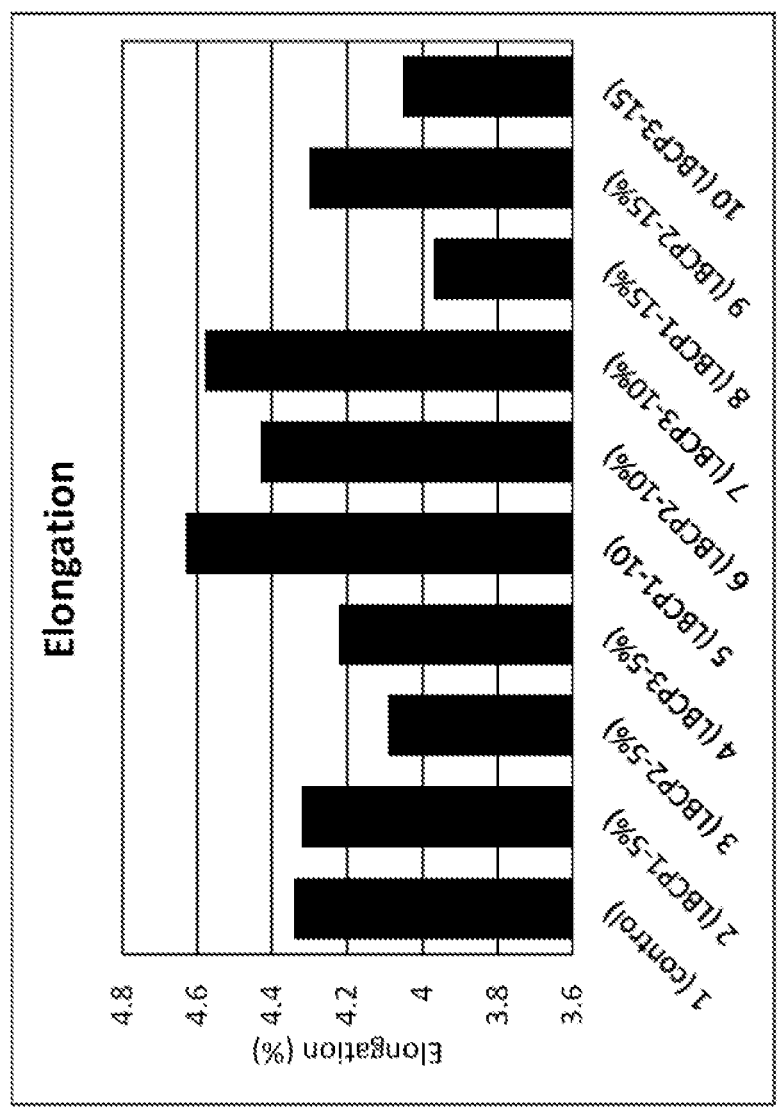
Figure 4E:
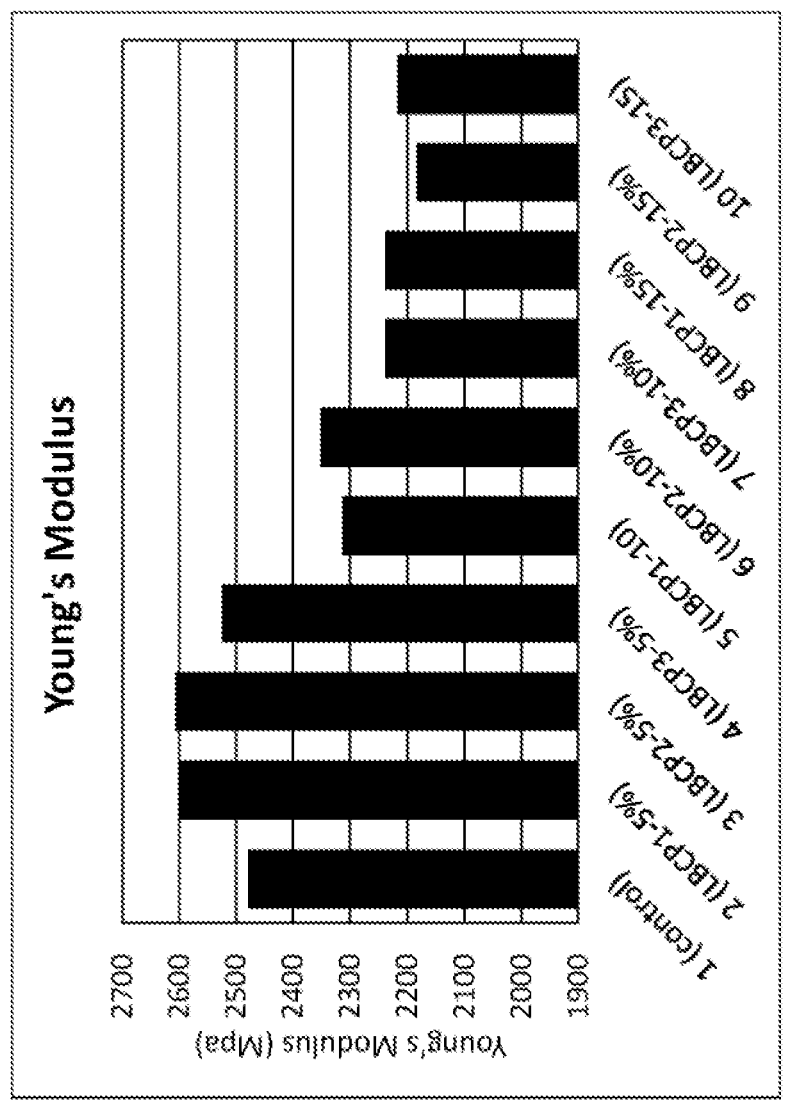
Figure 6A:
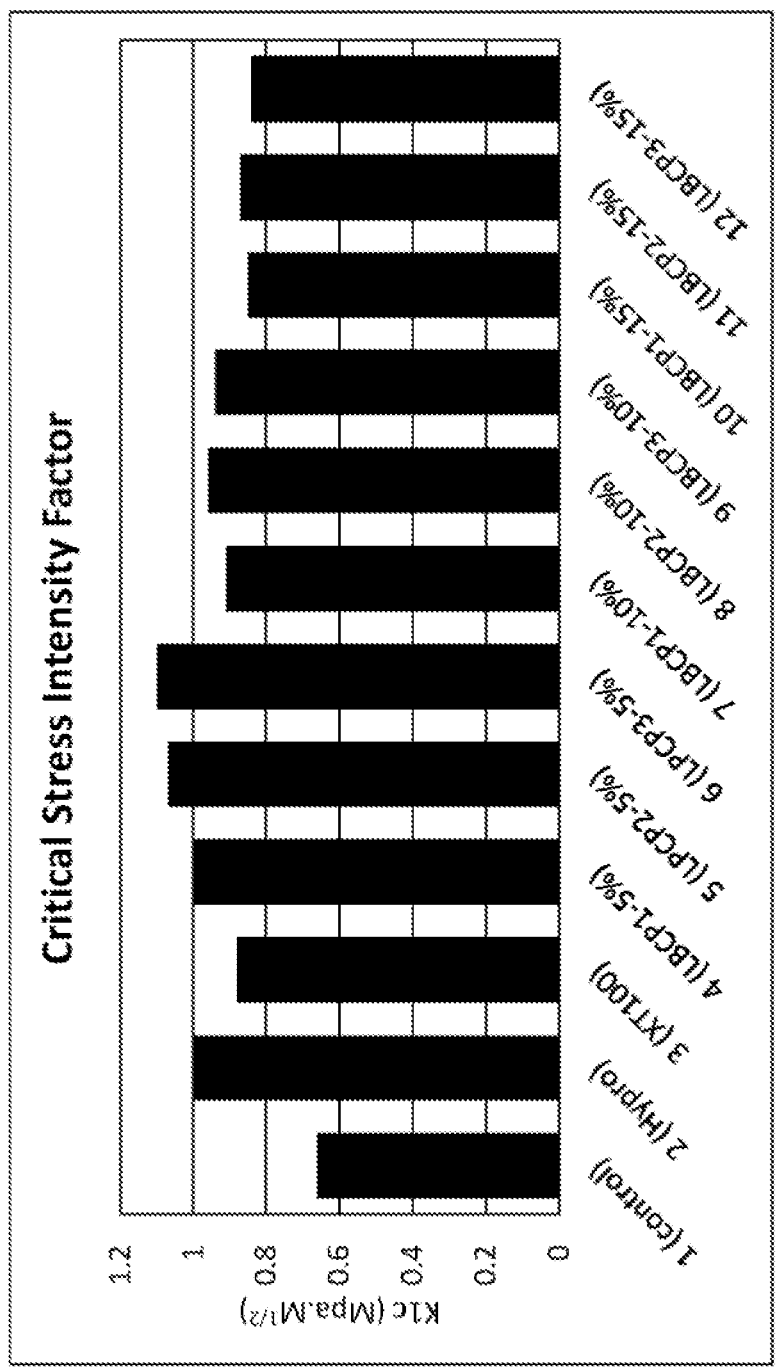
FIGS. 6a-6e show the performance test results of FIG. 5 in bar chart format.
Figure 6B:
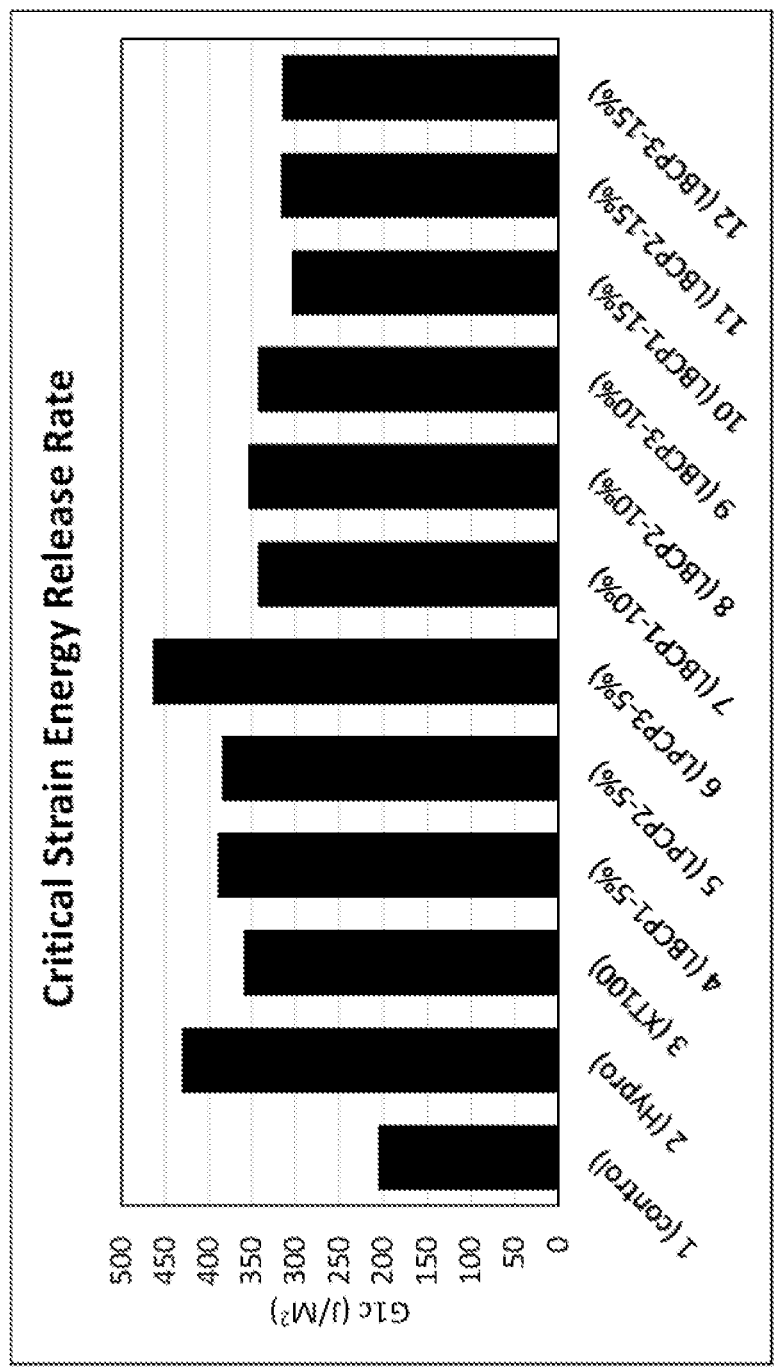
Figure 6C:
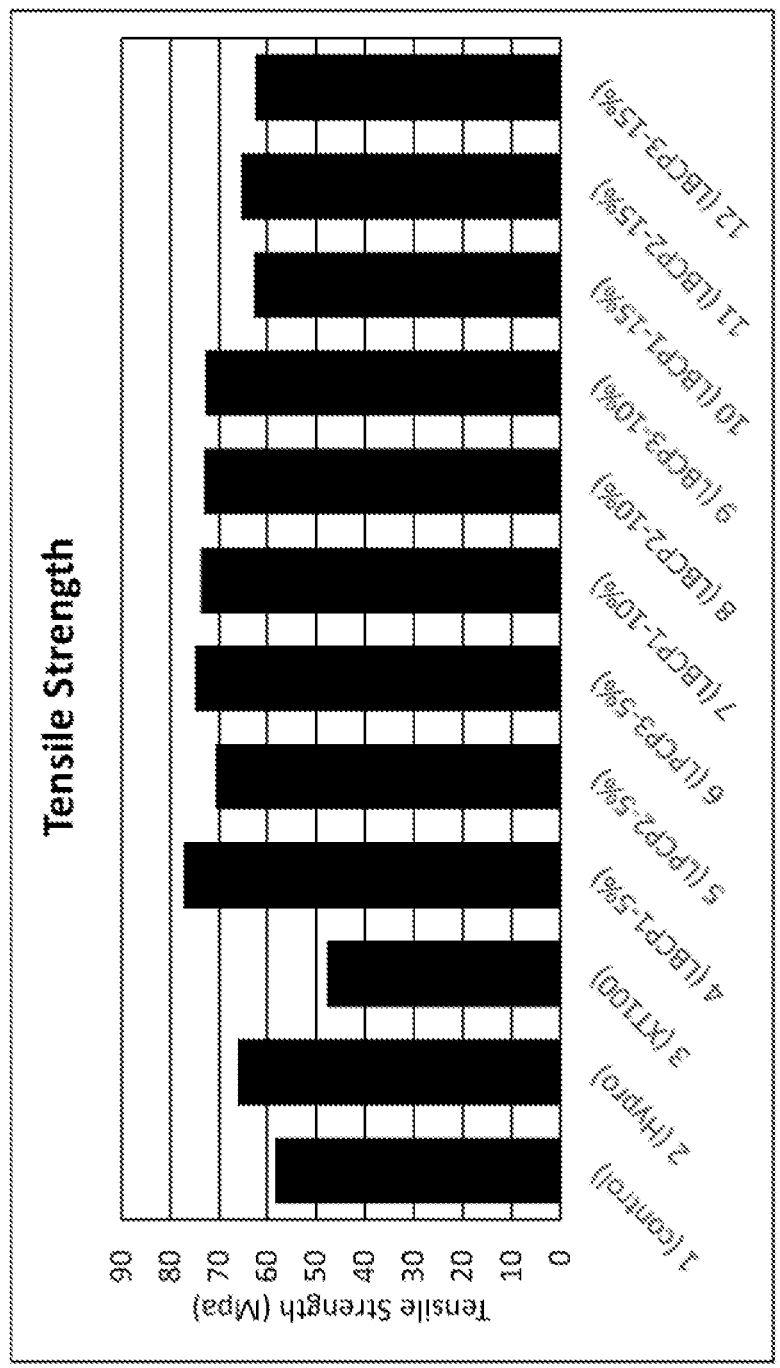
Figure 6D:
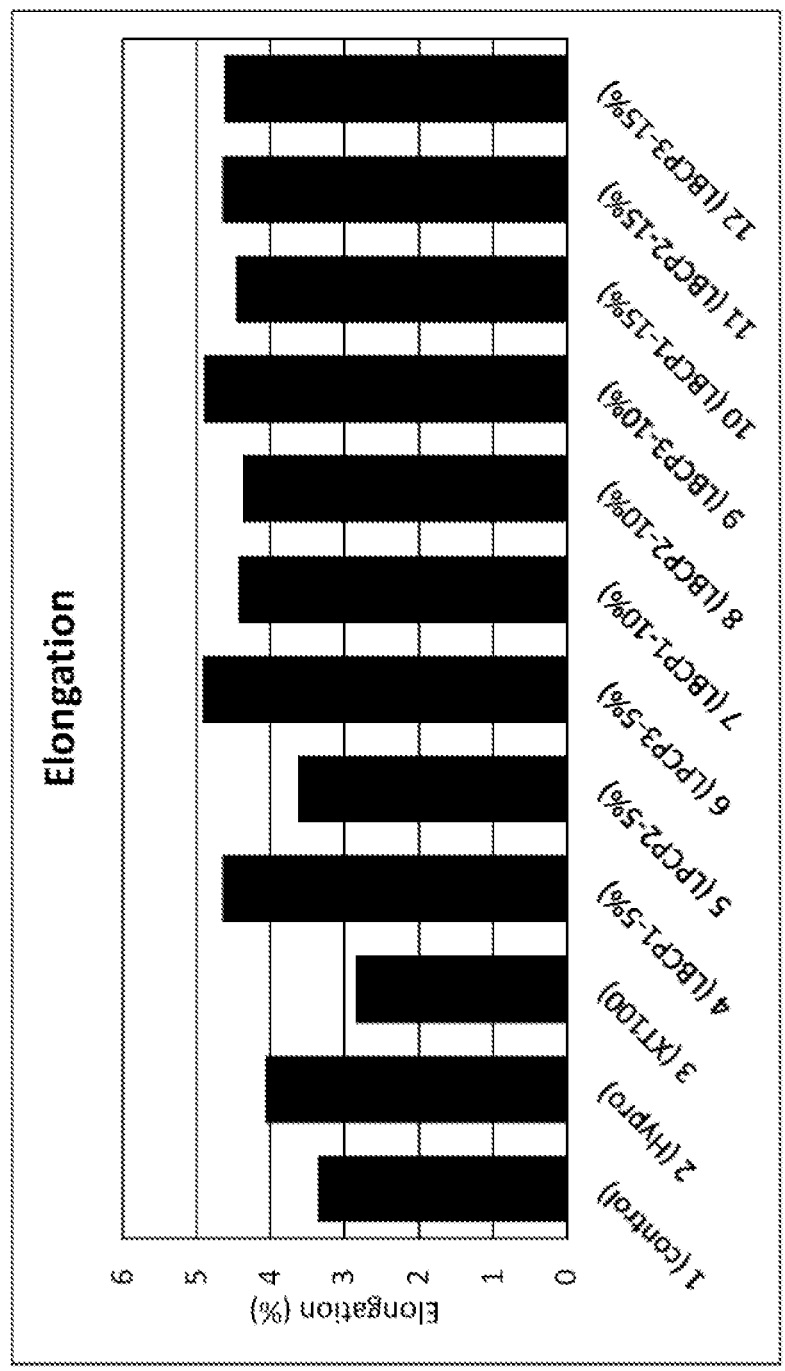
Figure 6E:
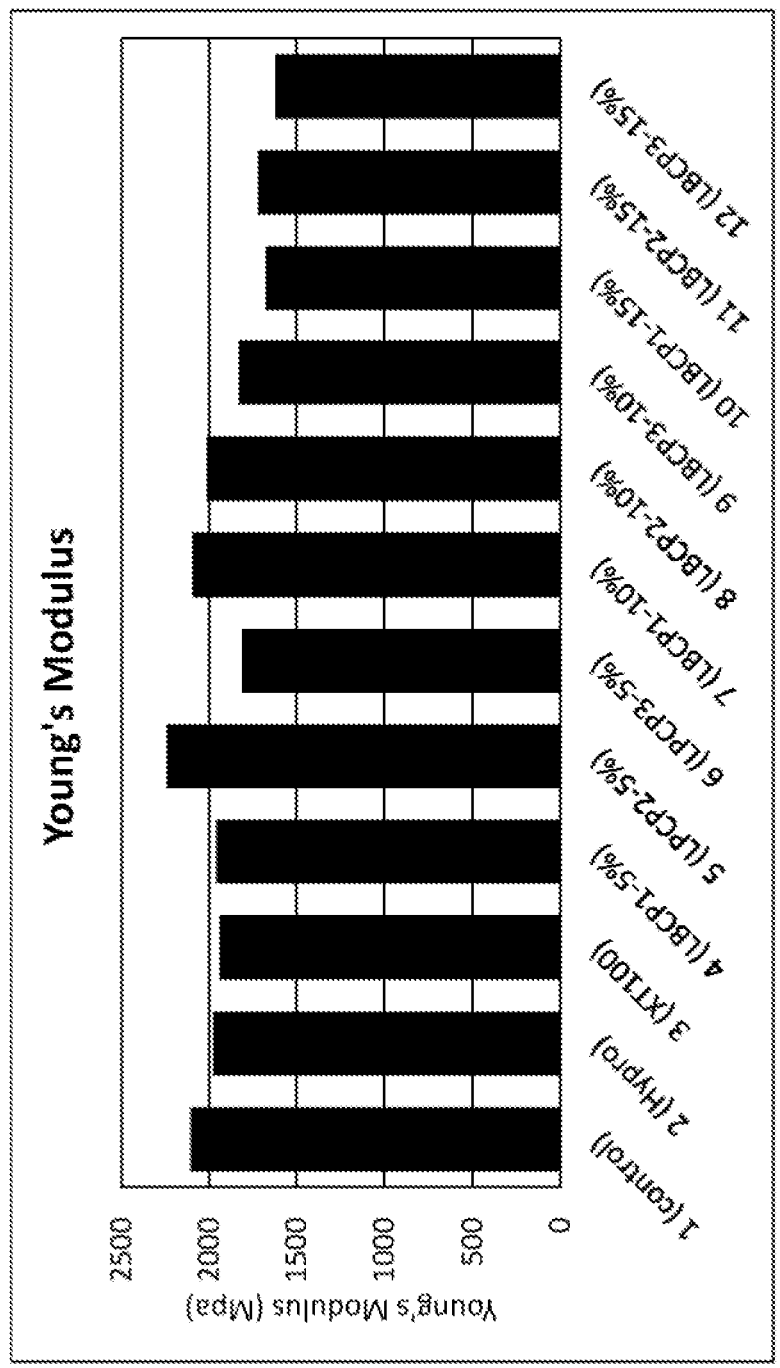

Embodiments of the inventive toughener 100 comprise a linear block copolymer no terminated on both ends by acrylates 120. Linear block copolymer 110 comprises repeating units of polydimethylsiloxane 130 and bisphenol A poly(ethylene oxide) his-alkyl ether140. FIG. 1 shows the general structure of toughener 100, where:

$R_1$ is either —H or —$CH_3$.
$R_2$ is an alkyl group having 2-3 carbons.
$R_3$ is an alkyl group having 2-3 carbons.
x indicates the number of repeating dimethylsiloxane units and ranges from 1 to 300.
y indicates the number of repeating ethylene oxide units and ranges from 1 to 100.
z indicates the number of repeating polydimethylsiloxane bisphenol A poly(ethylene oxide) bis-alkyl ether units and ranges from 1 to 100.

Synthesis of Preferred Embodiments

Polydimethylsiloxane and bisphenol A poly(ethylene oxide) bis-allyl ether may be synthesized in any manner as would be known to one of ordinary skill in the art. The linear block copolymer may be synthesized, for example, by combining 10 to 30 grants of hydride-terminated polydimethylsiloxane, 70 to 90 grams of bisphenol A poly(ethylene oxide) bis-allyl ether, and 0.01 to 0.1 gram of chloroplatinic acid in a reaction vessel, purging the mixture with $N_2$ gas, and then heating to 120° C. for one hour, yielding a silicon hydride terminated linear block copolymer. The toughener may be synthesized, for example, by combining 60 to 95 grams of the silicon hydride terminated linear block copolymer, 5 to 40 grams of allyl methacrylate, tot grant of p-methoxyphenol (MEW or phenothiazine, and 0.01 to 0.1 gram of chloroplatinic acid, and then heating the mixture to too 100° C. until all of the silicon hydride functional groups have been converted to acrylates, which can be determined by monitoring the disappearance of the silicon hydride peak using Fourier-transform infrared spectroscopy.

By varying the length of hydride-terminated polydimethylsiloxane and its ratio to bisphenol A poly(ethylene oxide) bis-allyl ether in polymerization steps, the inventors identified three preferred embodiments having the structural characteristics as shown in FIG. 2.

Use of the Inventive Toughener with a Vinyl Ester Resin

To demonstrate the enhanced properties associated with the use of the inventive toughener with a vinyl ester resin, the inventors prepared test samples using the inventive tougheners shown in FIG. 2 in varying proportions with a common vinyl ester resin commercially available under the trade name Herron 922®. The inventors added 1.5 grams of methyl ethyl ketone peroxide (MEKP) as an initiator and then cured the compounds at room temperature for 24 hours followed by 100° C. for 4 hours. The inventors then conducted a battery of industry-standard tests to determine various toughness properties of the cured compounds, including the following:

Critical stress intensity factor (Kw)
Critical strain energy release rate (G1c)
Tensile strength
Elongation
Young's modulus
Visual appearance before cure
Visual appearance after cure
Comparative impact resistance (1=worst, 5=best)

The table of FIG. 3 shows ten sample formulations and the numeric results of testing performed on the formulations; FIGS. 4a-4e show the test results in bar graph form. As can be seen, the different formulations of the inventive toughener resulted in different effects on the various toughness properties, indicating that varying the formulations can result in overall toughening improvements or in improvements optimized for specific toughness properties.

Use of the Inventive Toughener with an. Epoxy Resin

In addition to the use of the inventive toughener with unsaturated thermosetting resins, embodiments of the inventive toughener also proved useful in enhancing the toughness properties of epoxy-based resins. To demonstrate this, the inventors prepared ten sample formulations using the inventive tougheners shown in FIG. 2 in varying proportions with bisphenol A diglycidyl ether epoxy resin (commonly referred to as DGEBA or BADGE). As a comparison, the inventors also prepared two sample formulations using commercially-available tougheners, one being a carboxyl terminated butadiene-acrylonitrile copolymer containing pendant carboxyl functionality commercially available under the trade name of Hypro®1300X8 and the other being a methylmethacrylate-butadiene-styrene commercially available under the trade name Clearstrength® XT100. The inventors added 13 grams of triethylenetetramine (TETA) as a curing agent and then cured the compounds at room temperature for 24 hours followed by 100° C. for 4 hours. The inventors then conducted the same industry-standard tests to determine various toughness properties of the cured compounds. The table of FIG. 5 shows the twelve sample formulations and the numeric results of testing performed on the formulations; FIGS. 6a-6e showthe test results in bar graph form. As can be seen, the different formulations of the inventive toughener resulted in different effects on the various toughness properties, indicating that varying the formulations can result in overall toughening improvements or in improvements optimized for specific toughness properties.

Additional Embodiments

The inventive toughener 100 described in the foregoing embodiments of the present invention may be modified and/or extended by one of ordinary skill without departing from the spirit of the present invention, so long as the toughener (a) enhances one or more toughness attributes (e.g., critical stress intensity factor, critical strain energy release rate, tensile strength, elongation, Young's modulus, and impact resistance) when combined with thermosetting resins, (b) can be stably stored with thermosetting resins prior to curing, (c) has sufficiently-low viscosity to maintain processability, and (d) remains suitable for EB and UV curing.

Some of the preferred embodiments identify specific resins, however the inventive toughener may: be used with other resins as would be known by one of ordinary skill in the art, including but not limited to vinyl esters, unsaturated polyesters, acrylate functionalized resins, epoxies, and polyurethanes.

Some of the preferred embodiments identify: specific curing techniques, initiators, and curing agents, however depending on the choice of resin and application, other curing techniques and components may be used as would be known by one of ordinary skill in the art.

Some of the preferred embodiments place specific limits on the number of monomer units of the polymerized components (i.e., the values of x, y, and z in FIG. 1), however depending on the application and desired toughness attributes, other embodiments of the inventive toughener too may use the full disclosed range of polymerization.

The structure of the inventive toughener, as shown in Figure t, requires specific terminal functional groups and linear block copolymers, however, other functional groups may be added to toughener too to provide other features or attributes.

The proportions of resins and tougheners shown in FIGS. 3 and 5 are exemplary only, and one of ordinary skill in the art may create compounds with other proportions within the scope of the disclosure without undue experimentation. Further, one of ordinary skill may combine additional components with these formulations, including but not limited to additional tougheners, pigments, fillers, fibers, flame-retardants, and defoamers.

The structure of inventive toughener 100, as shown in FIG. 1, includes a polyethylene oxide ether, however, other short ether polymers such polypropylene oxide and polybutylene oxide ethers, or combinations of those ethers could be used.

In some of the preferred embodiments, the acrylate functional group is propyl methacrylate, however in other embodiments the acrylate functional group may be another acrylate including but not limited to ethyl methacrylate, ethyl acrylate, and propyl acrylate.

The invention claimed is:

1. A toughener for a thermosetting resin comprising:
a linear block copolymer comprising a plurality of alternating units of polydimethylsiloxane and bisphenol A poly(ethylene oxide) bis-propyl ether arranged in a sequence of —$(AB)_zA$—, where A is the polydimethylsiloxane, B is the bisphenol A poly(ethylene oxide) bis-propyl ether, and z is a number between t and too; and two propyl methacrylate functional groups, where one propyl methacrylate functional group is positioned on one end of the linear block copolymer and the other propyl methacrylate functional group is positioned on the other end of the linear block copolymer.

2. The toughener of claim 1, where
the polydimethylsiloxane comprises a plurality of dimethylsiloxane units arranged in a sequence of —(Si(CH$_3$)$_2$O)$_x$ Si(CH$_3$)—, where x is a number between 1 and 300.

3. The toughener of claim 1, where the polyethylene oxide ether is arranged in a sequence of —(OCH$_2$CH$_2$)$_y$O—, where y is a number between 1 and 100.

4. The toughener of claim 1, where
the polydimethylsiloxane comprises a plurality of dimethylsiloxane units arranged in a sequence of —(Si(CH$_3$)$_2$O) Si(CH$_3$)$_2$—, where x=1;
the polyethylene oxide ether is arranged in a sequence of —(OCH$_2$CH$_2$)$_y$O—, where y=5; and
z=2.

5. The toughener of claim 1, where
the polydimethylsiloxane comprises a plurality of dimethylsiloxane units arranged in a sequence of —(Si(CH$_3$)$_2$O)$_x$ Si(CH$_3$)$_2$—, where X=2;
the polyethylene oxide ether is arranged in a sequence of —(OCH$_2$CH$_2$)$_y$O—, where y=5; and
z=4.

6. The toughener of claim 1, where
the polydimethylsiloxane comprises a plurality of dimethylsiloxane units arranged in a sequence of —(Si(CH$_3$)$_2$O)$_x$ Si(CH$_3$)$_2$—, where x=4;
the polyethylene oxide ether is arranged in a sequence of —(OCH$_2$CH$_2$)$_y$O—, where y=5; and
z=8.

7. A resin system comprising:
an unsaturated thermosetting resin;
an initiator; and
a toughener comprising:
  a linear block copolymer comprising a plurality alternating units of polydimethylsiloxane and bisphenol A poly(ethylene oxide) bis-propyl ether arranged in a sequence of —(AB)$_z$A—, where A is the polydimethylsiloxane, B is the bisphenol A poly(ethylene oxide) his-propyl ether, and z is a number between 1 and 100; and
two propyl methacrylate functional groups, where one propyl methacrylate functional group is positioned on one end of the linear block copolymer and the other propyl methacrylate functional group is positioned on the other end of the linear block copolymer.

8. The resin system of claim 7, where
the polydimethylsiloxane comprises a plurality of dimethylsiloxane units arranged in a sequence of —(Si(CH$_3$)$_2$O)$_x$ Si(CH$_3$)$_2$—, where x is a number between 1 and 300; and
the ether is arranged in a sequence of —(OCH$_2$CH$_2$)$_y$O—, where y is a number between 1 and 100.

9. The resin system of claim 7, where
the polydimethylsiloxane comprises a plurality of dimethylsiloxane units arranged in a sequence of —(Si(CH$_3$)$_2$O)$_x$ Si(CH$_3$)$_2$—, where x=1;
the ether is arranged in a sequence of —(OCH$_2$CH$_2$)$_y$O—, Where y=5; and z=2.

10. The resin system of claim 7, where
the polydimethylsiloxane comprises a plurality of dimethylsiloxane units arranged in a sequence of —(Si(CH$_3$)$_2$O)$_x$ Si(CH$_3$)$_2$—, where X=2;
the ether is arranged in a sequence of (—O—CH$_2$—CH$_2$—)$_y$—O—, where y=5; and
z=4.

11. The resin system of claim 7, where
the polydimethylsiloxane comprises a plurality of dimethylsiloxane units arranged in a sequence of —(Si(CH$_3$)$_2$O)$_x$ Si(CH$_3$)$_2$—, where x=4;
the ether is arranged in a sequence of —(OCH$_2$CH$_2$)$_y$O—, where y=5; and z=8.

12. The resin system of claim 7, where
the unsaturated thermosetting resin is a vinyl ester thermosetting resin.

13. A resin system comprising:
an epoxy thermosetting resin;
a curing agent; and
a toughener comprising:
  a linear block copolymer comprising a plurality alternating units of polydimethylsiloxane and bisphenol A poly(ethylene oxide) bis-propyl ether arranged in a sequence of —(AB)$_z$A—, where A is the polydimethylsiloxane, B is the bisphenol A poly(ethylene oxide) bis-propyl ether, and z is a number between 1 and 100; and
two propyl methacrylate functional groups, where one propyl methacrylate functional group is positioned on one end of the linear block copolymer and the other propyl methacrylate functional group is positioned on the other end of the linear block copolymer.

14. The resin system of claim 13, where
the polydimethylsiloxane comprises a plurality of dimethylsiloxane units arranged in a sequence of —(Si(CH$_3$)$_2$O)$_x$ Si(CH$_3$)$_2$—, where x is a number between 1 and 300; and
the ether is arranged in a sequence of —(OCH$_2$CH$_2$)$_y$O—, where y is a number between 1 and 100.

15. The resin system of claim 13, where
the polydimethylsiloxane comprises a plurality of dimethylsiloxane units arranged in a sequence of —(Si(CH$_3$)$_2$O)$_x$ Si(CH$_3$)$_2$—, where x=1;
the ether is arranged in a sequence of —(OCH$_2$CH$_2$)$_y$O—, where y=5; and
z=2.

16. The resin system of claim 13, where
the polydimethylsiloxane comprises a plurality of dimethylsiloxane units arranged in a sequence of —(Si(CH$_3$)$_2$O)$_x$ Si(CH$_3$)$_2$—, where x=2;
the ether is arranged in a sequence of —(OCH$_2$CH$_2$)$_y$O—, where y=5; and
z=4.

17. The resin system of claim 13, where
the polydimethylsiloxane comprises a plurality of dimethylsiloxane units arranged in a sequence of —(Si(CH$_3$)$_2$O) Si(CH)—, where x=4;
the ether is arranged in a sequence of —(OCH$_2$CH$_2$)$_y$O—, where y=5; and
z=8.

18. A toughener for a thermosetting resin comprising:
a linear block copolymer comprising a plurality of alternating units of polydimethylsiloxane and bisphenol A poly(ethylene oxide) bis-propyl ether arranged in a sequence of —(AB)$_z$A—, where A is the polydimethylsiloxane, B is the bisphenol A poly(ethylene oxide) bis-propyl ether, and z is a number between 1 and 100;

a first functional group having the formula $CH_2CR_1COOR_2$—, where $R_1$ is either —H or —$CH_3$, $R_2$ is either —$CH_2CH_2$— or —$CH_2CH_2CH_2$—, and the first functional group is positioned on a first end of the linear block copolymer; and a second functional group having the formula $CH_2CR_1COOR_2$—, Where $R_1$ is either —H or —$CH_3$, $R_2$ is either —$CH_2CH_2$— or —$CH_2CH_2CH_2$—, and the second functional group is positioned on a second end of the linear block copolymer.

19. A toughener for a thermosetting resin comprising:

a linear block copolymer comprising a plurality of alternating units of polydimethylsiloxane and bisphenol A poly(ethylene oxide) bis-propyl ether arranged in a sequence of —$(AB)_zA$—, where A is the polydimethylsiloxane, B is the bisphenol A poly(ethylene oxide) his-propyl ether, and z is a number between 1 and 100;

a first functional group selected from the group consisting of ethyl methacrylate, ethyl acrylate, and propyl acrylate, where the first functional group is positioned on a first end of the linear block copolymer; and a second functional group selected from the group consisting of ethyl methacrylate, ethyl acrylate, and propyl acrylate, where the second functional group is positioned on a second end of the linear block copolymer.

20. A resin system comprising:

an unsaturated thermosetting resin;

an initiator; and a toughener comprising:

a linear block copolymer comprising a plurality alternating units of polydimethylsiloxane and bisphenol A poly(ethylene oxide) bis-propyl ether arranged in a sequence of —$(AB)_zA$—, where A is the polydimethylsiloxane, B is the bisphenol A poly(ethylene oxide) bis-propyl ether, and z is a number between 1 and 100;

a first functional group having the formula $CH_2CR_1COOR_2$—, where $R_1$ is either —H or —$CH_3$, $R_2$ is either —$CH_2CH_2$— or —$CH_2CH_2CH_2$—, and the first functional group is positioned on a first end of the linear block copolymer; and a second functional group having the formula $CH_2CR_1COOR_2$—, where $R_1$ is either —H or —$CH_3$, $R_2$ is either —$CH_2CH_2$— or —$CH_2CH_2CH_2$—, and the second functional group is positioned on a second end of the linear block copolymer.

21. A resin system comprising:

an unsaturated thermosetting resin;

an initiator; and a toughener comprising:

a linear block copolymer comprising a plurality alternating units of polydimethylsiloxane and bisphenol A polyethylene oxide) bis-propyl ether arranged in a sequence of —$(AB)_zA$—, where A is the polydimethylsiloxane, B is the bisphenol A polyethylene oxide) bis-propyl ether, and z is a number between 1 and 100;

a first functional group selected from the group consisting of ethyl methacrylate, ethyl acrylate, and propyl acrylate, where the first functional group is positioned on a first end of the linear block copolymer; and a second functional group selected from the group consisting of ethyl methacrylate, ethyl acrylate, and propyl acrylate, where the second functional group is positioned on a second end of the linear block copolymer.

* * * * *